Patented Aug. 2, 1932

1,869,636

UNITED STATES PATENT OFFICE

RAYMOND M. WARNER, OF BARBERTON, OHIO, ASSIGNOR, BY MESNE ASSIGNMENTS, TO THE MILLER RUBBER COMPANY INC., OF WILMINGTON, DELAWARE, A CORPORATION OF DELAWARE

PROCESS OF CEMENTING RUBBER TO METAL AND PRODUCT

No Drawing. Application filed May 29, 1928. Serial No. 281,588.

This invention relates to a rubber cement and process for producing and using the same for forming a permanent bond between rubber and metals or analogous surfaces.

An object of the invention is to produce an effective adhesive for this purpose having stable qualities for effecting a union between rubber, metal, glass, wood, or other material, which union will last indefinitely without deterioration of the adhesive character of the bonding cement.

A further object is to produce a cement which can be applied to a metal surface such as iron and thereafter a layer of raw rubber compounded with the proper ingredients for vulcanization may be applied and vulcanized, the cement never curing but remaining adhesive to effect the bond.

Other objects will appear hereinafter.

The invention consists in making rubber cement, adapted to be used in uniting layers of rubber to surfaces of metal and other materials and specially adapted for use in the lining of metal tanks and drums with rubber, though it may also be used for cementing rubber lining to wooden tanks and tanks of other materials.

The rubber cement is made by treating dissolved rubber with one of the halogen elements.

The rubber is put into a solution in one of the well known rubber solvents such as benzol, toluol, or xylol, and bromine being found to be the most desirable halogen element for this use, is dissolved in a similar solvent and the dissolved rubber and halogen are mixed together and stirred until a homogeneous cement is produced.

It is found that where too much bromine is introduced the rubber material has a tendency to coagulate and separate from the solvent and to make the cement difficult to spread, whereas, if too small an amount of bromine is used the cement does not develop the proper adhesive properties to permanently unite the rubber to the metal or other surfaces.

Experiment has shown that using 136 grams of crude rubber and from 40 to 80 grams of bromine, will make a successful cement which is only partly brominated and which will keep in a stable condition of adhesiveness for a long time.

Rubber is generally accepted as being an unsaturated hydrocarbon with an empirical formula $(C_{10}H_{16})_x$, with two double bonds in each $C_{10}H_{16}$ unit. This is corroborated by the fact that a quantity of rubber corresponding to the molecular weight of such a unit, namely, 136 parts, is able to add two molecular portions or 320 parts by weight of bromine before becoming saturated. It is evident, therefore, that the preferred cements contain only one-eighth to one-fourth the proportion of bromine required to saturate the rubber.

The metal surface to which the rubber layer is to be cemented is cleaned preferably by sand blasting and a coat of cement is applied and any layers of rubber which are to be attached to the metal surface are then pressed against this coat of cement, after sufficient time has been allowed for the solvent to evaporate from the cement.

The applied layer of rubber afterwards can be vulcanized in any desired manner.

In lining a metal tank, such as iron, a coat of the brominated rubber cement is applied to the metal surface and thereafter the tank lining material of raw rubber compounded with the proper ingredients for vulcanization may be applied and vulcanized.

The layer of brominated rubber never cures and even tends somewhat to retard the vulcanization of the adjacent layer of rubber, so that in this process when plied stocks of sulfur containing stock and accelerating stock are used, it is desirable to place the sulfur containing layer next to the brominated rubber cement layer and to then apply the accelerator containing layer which contains no sulfur.

The fact that the partially brominated rubber cement is not cured and remains adhesive is depended upon to provide the adhesive bond between the metal and rubber and constitutes a salient feature of the present invention.

By this process the vulcanization is continued only long enough to vulcanize the applied layers of raw rubber but is stopped far short of curing of the brominated layer, the adhesiveness of which would be reduced by curing.

Other halogen elements may be used in place of bromine, which however produces a superior cement and is preferable for this purpose. Iodine is more active than bromide and can be used but is not as controllable as the bromine. Successful results have been obtained by the use of chlorine equal to those resulting from the use of bromine but chlorine occurring only as a gas at ordinary temperatures and pressures, it is more difficult to prepare the cement as it is necessary to add the chlorine by piping the gas through the dissolved rubber.

Brominated cement or chlorinated cement prepared as above set forth will produce a very firm and durable joint between a layer of iron and a layer of rubber, of which rubber cements heretofore used are not capable.

I claim:

1. The process of cementing rubber to metal comprising applying to the metal surface a coat of a cement of brominated rubber in which the proportion of bromine is from one-eighth to one-fourth that required to saturate the rubber, superimposing a layer of vulcanizable rubber thereon, and subjecting the rubber to vulcanization.

2. A laminated structure comprising a layer of metal and a layer of vulcanized rubber integrally united through the intermediary of a thin layer of brominated rubber in which the proportion of bromine is from one-eighth to one-fourth that required to saturate the rubber.

In testimony whereof, I affix my signature.

RAYMOND M. WARNER.

CERTIFICATE OF CORRECTION.

Patent No. 1,869,636.  August 2, 1932.

RAYMOND M. WARNER.

It is hereby certified that the name of the assignee by mesne assignments in the above numbered patent was erroneously described and specified as "The Miller Rubber Company, Inc.", whereas said name should have been described and specified as "Miller Rubber Company, Inc.", as shown by the records of assignments in this office; page 2, line 7, for "bromide" read "bromine"; and that the said Letters Patent should be read with these corrections therein that the same may conform to the record of the case in the Patent Office.

Signed and sealed this 7th day of February, A. D. 1933.

(Seal)

M. J. Moore,
Acting Commissioner of Patents.

short of curing of the brominated layer, the adhesiveness of which would be reduced by curing.

Other halogen elements may be used in place of bromine, which however produces a superior cement and is preferable for this purpose. Iodine is more active than bromide and can be used but is not as controllable as the bromine. Successful results have been obtained by the use of chlorine equal to those resulting from the use of bromine but chlorine occurring only as a gas at ordinary temperatures and pressures, it is more difficult to prepare the cement as it is necessary to add the chlorine by piping the gas through the dissolved rubber.

Brominated cement or chlorinated cement prepared as above set forth will produce a very firm and durable joint between a layer of iron and a layer of rubber, of which rubber cements heretofore used are not capable.

I claim:

1. The process of cementing rubber to metal comprising applying to the metal surface a coat of a cement of brominated rubber in which the proportion of bromine is from one-eighth to one-fourth that required to saturate the rubber, superimposing a layer of vulcanizable rubber thereon, and subjecting the rubber to vulcanization.

2. A laminated structure comprising a layer of metal and a layer of vulcanized rubber integrally united through the intermediary of a thin layer of brominated rubber in which the proportion of bromine is from one-eighth to one-fourth that required to saturate the rubber.

In testimony whereof, I affix my signature.

RAYMOND M. WARNER.

CERTIFICATE OF CORRECTION.

Patent No. 1,869,636.   August 2, 1932.

RAYMOND M. WARNER.

It is hereby certified that the name of the assignee by mesne assignments in the above numbered patent was erroneously described and specified as "The Miller Rubber Company, Inc.", whereas said name should have been described and specified as "Miller Rubber Company, Inc.", as shown by the records of assignments in this office; page 2, line 7, for "bromide" read "bromine"; and that the said Letters Patent should be read with these corrections therein that the same may conform to the record of the case in the Patent Office.

Signed and sealed this 7th day of February, A. D. 1933.

(Seal)

M. J. Moore,
Acting Commissioner of Patents.

CERTIFICATE OF CORRECTION.

Patent No. 1,869,636.  August 2, 1932.

RAYMOND M. WARNER.

It is hereby certified that the name of the assignee by mesne assignments in the above numbered patent was erroneously described and specified as "The Miller Rubber Company, Inc.", whereas said name should have been described and specified as "Miller Rubber Company, Inc.", as shown by the records of assignments in this office; page 2, line 7, for "bromide" read "bromine"; and that the said Letters Patent should be read with these corrections therein that the same may conform to the record of the case in the Patent Office.

Signed and sealed this 7th day of February, A. D. 1933.

(Seal)

M. J. Moore,
Acting Commissioner of Patents.